INVENTORS:
Peter S. Glaser
James F. Hudson
Walter G. Edwards
Sigmund N. Porter

Louis A. Kline
John J. Matlago
Attorneys

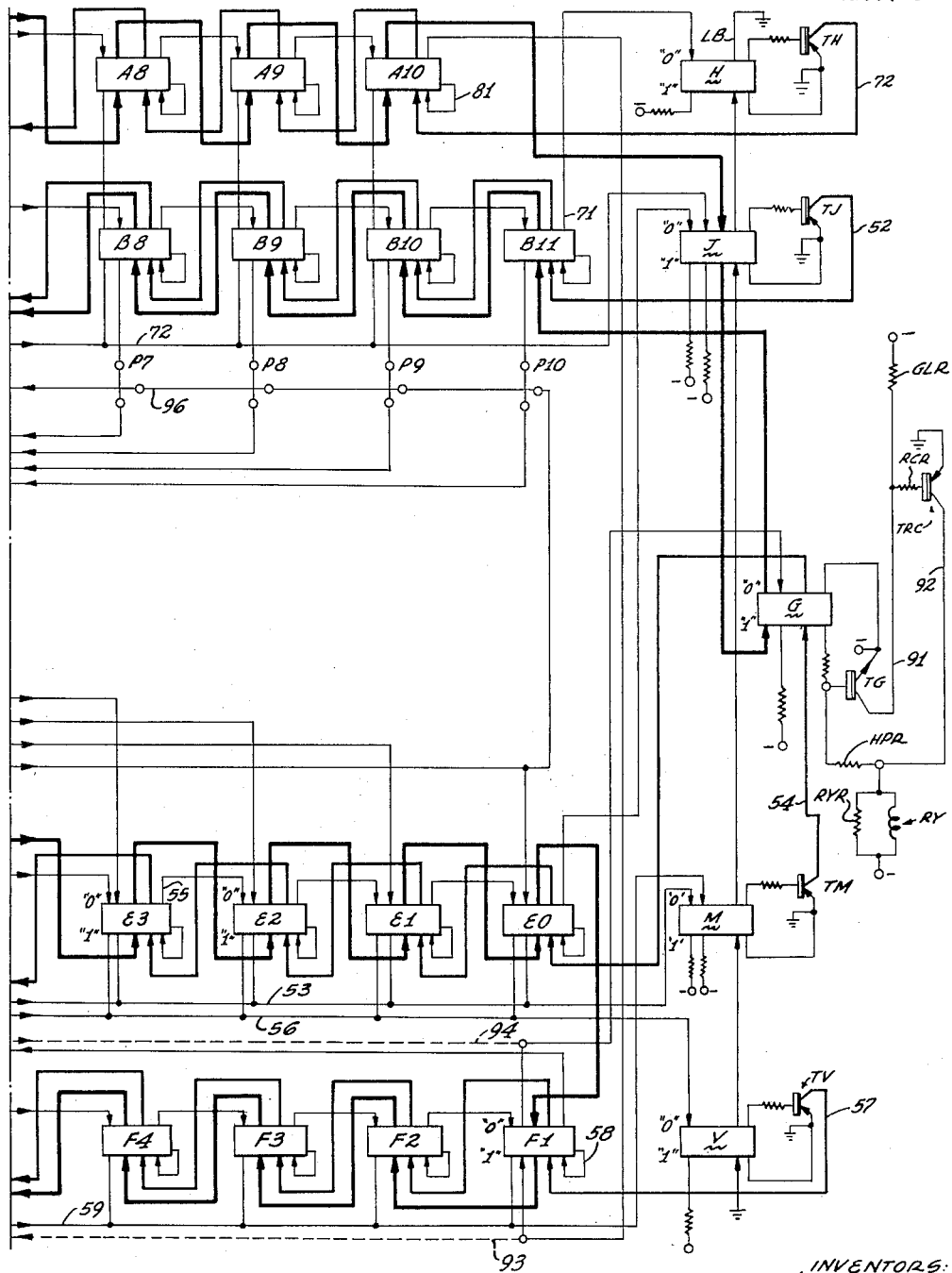

United States Patent Office 3,040,985
Patented June 26, 1962

3,040,985
INFORMATION NUMBER AND
CONTROL SYSTEM
Peter S. Glaser, Culver City, James F. Hudson, Hermosa Beach, Walter G. Edwards, Manhattan Beach, and Sigmund N. Porter, Beverly Hills, Calif., assignors to The National Cash Register Company, Dayton, Ohio, a corporation of Maryland
Filed Dec. 2, 1957, Ser. No. 699,984
28 Claims. (Cl. 235—153)

This invention relates to electronic control devices and systems such as error detecting devices and systems for computer machines, and more particularly to devices and systems for checking the accuracy of registration of plural-digit descriptive numbers in keyboard input machines.

In some keyboard-operated computing machines and especially those employed in accounting services, descriptive numbers as well as quantitative numbers are manually entered by operation of keyboard keys. The descriptive numbers may serve, for example, as account numbers identifying a business account with which previously or subsequently registered quantitative number information is concerned, or other non-quantitative data; hence they may be termed information numbers. Errors in keyboard entry of information numbers are, in general, not detectable by apparatus employed in checking or verifying entries or registrations of numerical values; but it is obvious that means capable of checking the accuracy of information number entries may in many cases be of considerable value. For example, in retail accounting, verification of the accuracy of entry of an account number in automatic billing would be of material aid in elimination of incorrect billing of an item to a customer.

Briefly, a specific application of the present invention provides a system of exclusive selected plural-digit numbers to be used as information numbers, and a system of apparatus effective to detect an error in entry of an information number of the system on the keyboard of a machine; and effective upon detection of an error to provide a machine-controlling or operator-warning signal. Each number of the system is composed or formulated to conform with a mathematical rule, and the apparatus determines whether the number actually entered on the keyboard of the machine conforms with the rule. If the entered number conforms with the rule, the apparatus permits the machine to record or register the number, but if violation of the rule is detected, operation of the machine is interrupted and preferably also a signal is provided to inform the machine operator of the error in entry. The rule to which each of the information numbers of the system conforms may, for example, be such that if each digit of the number is multiplied by a "weighting" value, no two of which values are alike and none of which is zero and each of which is assigned a definite serial or "column" position in the information number, and the sum of all the products thus found is divided by a predetermined modulus, no remainder is left. The exemplary rule may be mathematically expressed:

$$\sum_{i=1}^{i=n} D_i W_i \equiv 0 \bmod p \qquad (A)$$

wherein $D_i$ is the digit in the $i$'th serial position in the information number, $n$ is the numerical quantity of digits in the number, $W_i$ is the numerical weighting value assigned to the $i$'th serial position, and $p$ is the predetermined modulus which preferably is greater than $n$ and is so selected in a manner and for reasons hereinafter made evident. Expression A may be read: the sum of the products of the individual information number digits multiplied by their respective weighting numbers is divisible by modulus $p$ without a remainder. As will later be made evident, the rule is equally valid and easily mechanized when the remainder is not zero but is a number less than $p$.

It is an object of the present invention, therefore, to provide an inexpensive and simple system and means for automatically checking accuracy of entry of plural-digit information numbers on keyboard-input machines.

Another object of the invention is to provide a system of information numbers susceptible of simple check for accuracy of entry involving only simple machine-performed arithmetic operations.

Another object of the invention is the provision of means adapted to incorporation into or operation with present commercially used keyboard-operated computer machines and capable of checking the accuracy of keyboard entries of properly formulated information numbers.

Another object of the invention is to provide a system and apparatus capable of checking with great rapidity the accuracy of an information number entered on a keyboard, and capable of providing an error indicating signal prior to actual recording or registration of an erroneous information number entry.

Another object of the invention is to provide a plurality of novel control units and means whereby an ability to perform a control function may be transferred to one or more other similar units by an operation performed on the first unit.

Other objects and advantages of the invention will hereinafter be made apparent to those skilled in the art, in the following description of a preferred exemplary system and embodiment of apparatus according to the invention, reference being made to the appended drawings forming a part of the description and in which drawings.

Figure 1:
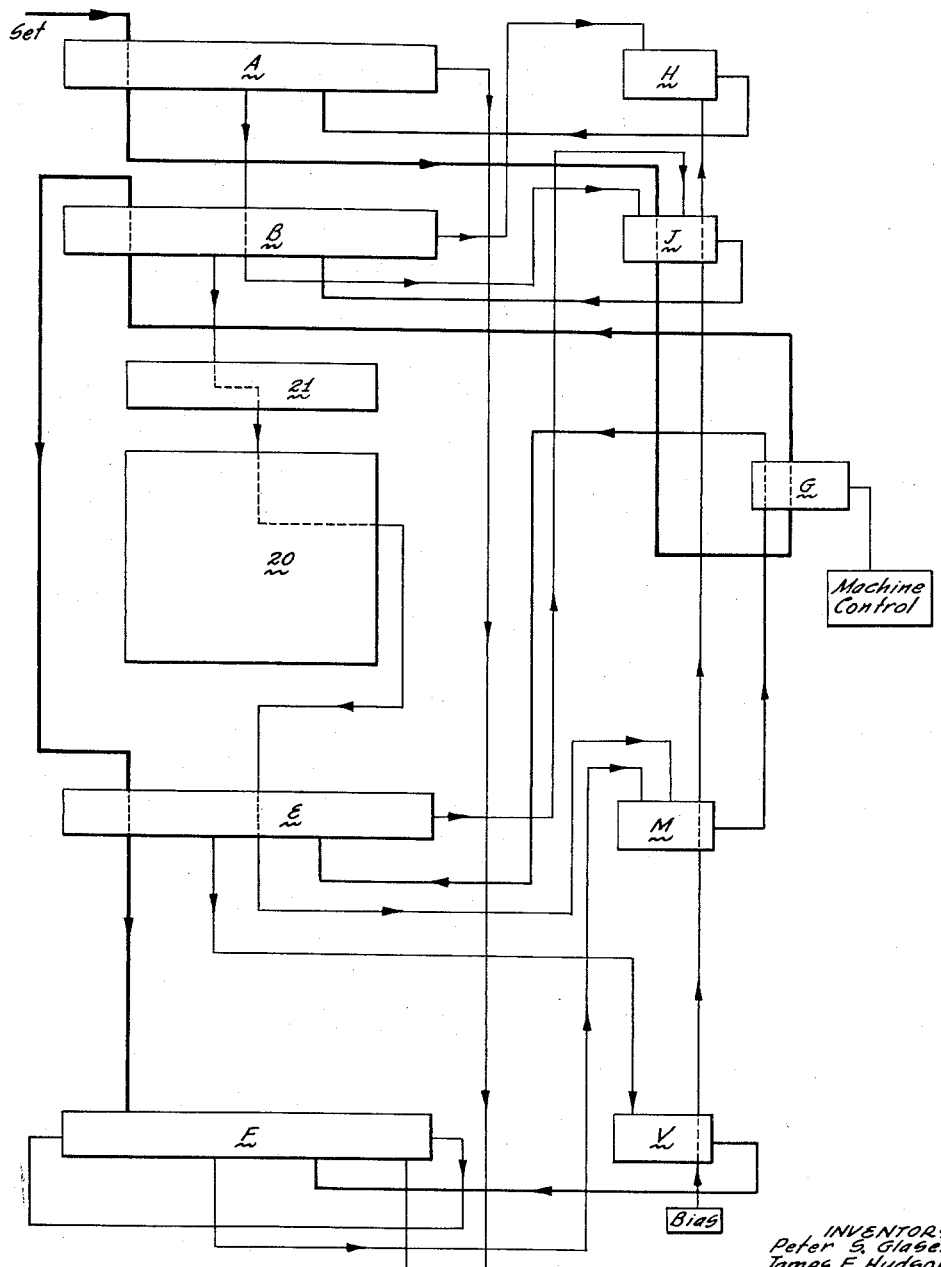
FIG. 1 is a schematic block diagram illustrating principal apparatus organizations in block form with interconnecting lines denoting functional control of one or more organizations by another.
Figure 2:
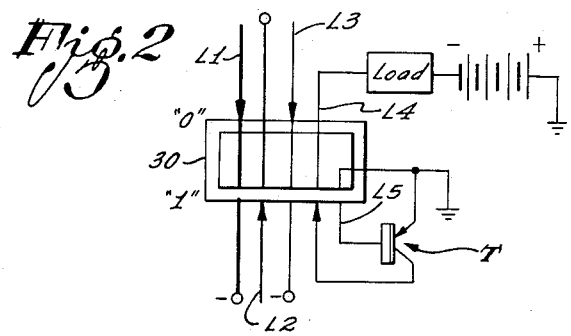
FIG. 2 is a diagram, partly schematic, illustrating a bistable magnetic element or core and associated electrical circuitry including a transistor, and symbolically depicting the two opposite remanent magnetic states of the core and the current flow directions which will coerce or drive the core to respective opposite magnetic states.
Figure 4:
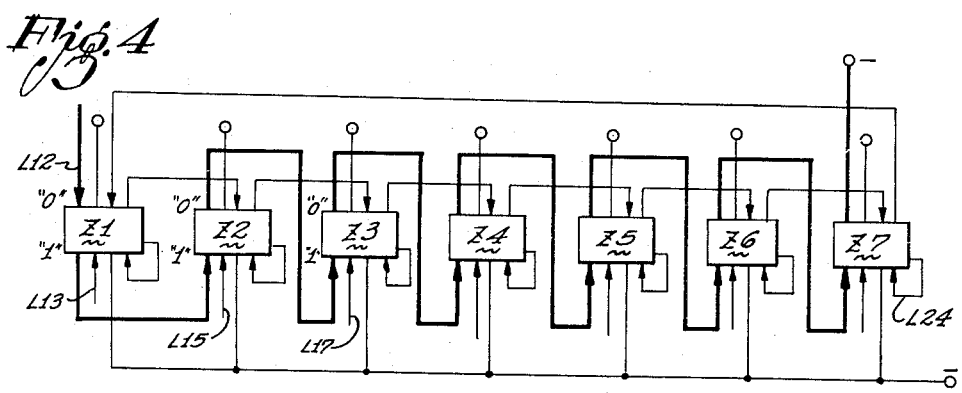
Figure 5A:
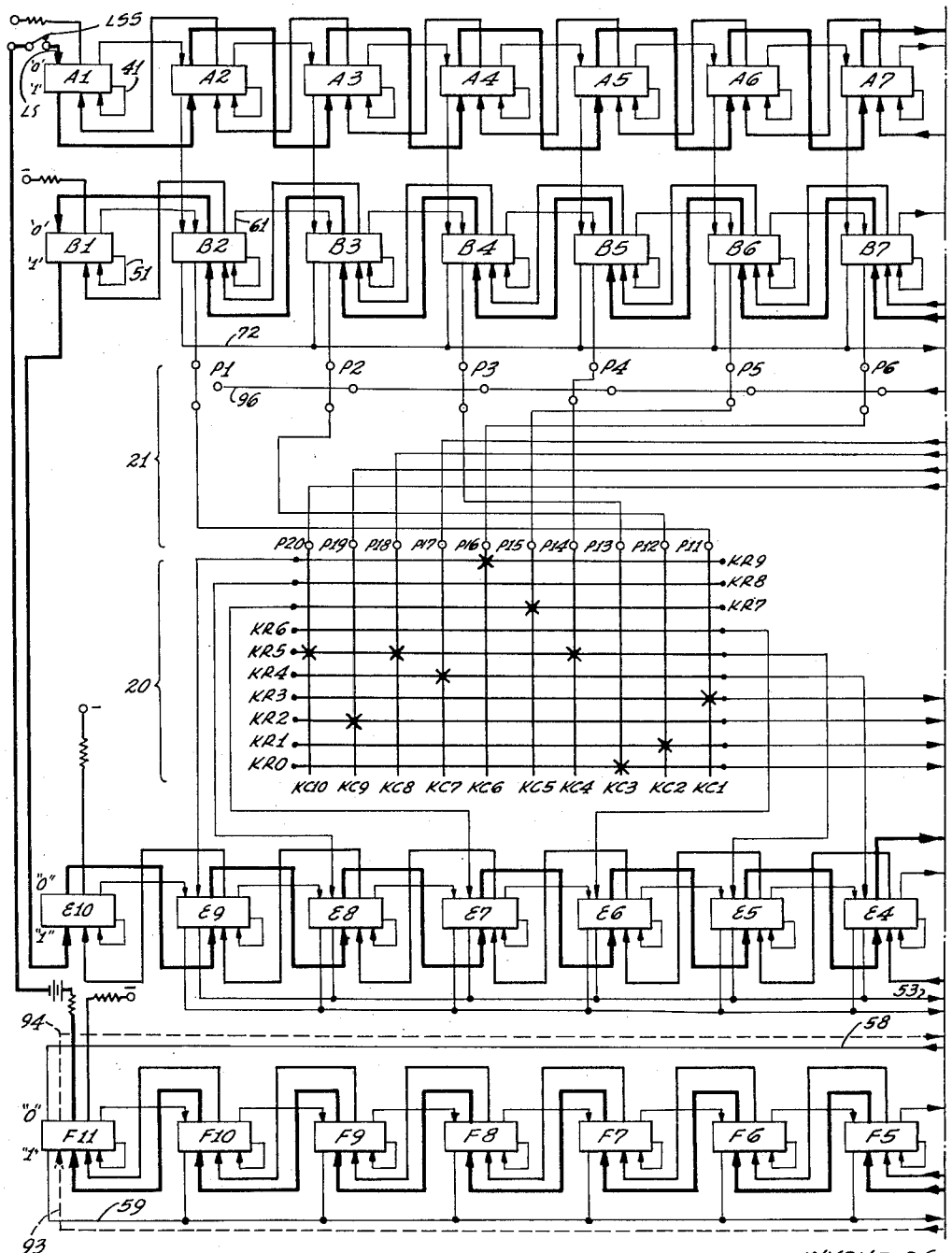

FIG. 4 is a diagram illustrating a combination of units of the nature of those depicted in FIGS. 1 and 2, concatenated to form a recirculating shifting register; and FIGS. 5a and 5b are component parts of a schematic diagram of apparatus including circuit elements including units of the character of that depicted in FIG. 2, arranged and adapted to perform mathematical operations of a specific nature.

While account or information numbers of any required or desired quantity of digits may be accommodated in a system according to the invention, they are, in the specific exemplary embodiment hereinafter described, limited to numbers of ten digits each for the sake of simplifying the disclosure.

Errors in entering plural-digit numbers on a keyboard may arbitrarily be classified into three groups. It appears that (1) single digit errors, that is, those involving entry of one and one only incorrect digit, may predominate, with (2) interchange of two digits, and (3) higher order errors (such as two single-digit errors in the same number) following in that order. These three groups shall presently be separately considered in regard to the components of expression A.

It is desirable that an error-detecting device of the character hereinbefore indicated detect all single-digit errors in entry of a number. As an aid in choosing a value of modulus $p$ and values of $Wi$ fitting expression A and such as to accomplish the mentioned detection of single digit errors, a single error in the $j$'th position is arbitrarily assumed; that is, it is assumed that $Dj''$ is entered instead of correct digit $Dj$. The effect of the erroneous entry is to change the summation, $\Sigma$, of expression A by a quantity equal to $Wj(Dj''-Dj)$. It is evident that if the erroneous entry is to escape detection, this stated product or quantity must also conform with expression A; that is, $Wj(Dj''-Dj)$ must also be congruent with modulus $p$ with no remainder. Hence, if $p$ is selected from only prime numbers, either $Wj$ or $(Dj''-Dj)$ must either be divisible by or equal to $p$ to enable the erroneous entry to conform to expression A. To eliminate that possibility, $p$ may be selected from only those prime numbers which are greater than $(Dj''-Dj)$ and greater than any assigned weight value $W$, whereby the product cannot possibly be equal to $p$. Since in the decimal system the maximum value $(Dj''-Dj)$ may assume is nine (9−0), any prime number greater than nine will satisfy the first requisite.

The largest value $W$ may have is dependent upon the numerical quantity of digits in the information number, since the weighting numbers are to be different, each from the others. Since, in general, approximately $1/p$ of all possible information numbers will satisfy the requirements imposed by expression A, the numerical quantity ($n$) of digits selected for each information number should be sufficiently large to provide an ample quantity of acceptable information numbers. In the exemplary embodiment of a system according to the invention, $n$ is selected to be ten, since $10^{10} \div p$ appears to furnish an ample stock of acceptable numbers even where the modulus $p$ is of quite large value. With $n$ selected as ten, a series of ten weighting numbers $W$, each greater than zero and preferably all different for a reason hereinafter made evident, must be selected; and $p$ then selected in accordance with the previously stated requirement that $p>W$. In the illustrative example, the ten individual digit positions of an information number may be assigned respective weights (weighting values or numbers) 1 through 10, in any order desired, with each weight assigned to only one information number digit position or keyboard column. Further, since in the chosen exemplary system $n=10$ and $W \leqq 10$, and since the maximum value $(Dj''-Dj)$ may then assume is nine, $p$ may in the example be any prime number greater than 10. Since the acceptable information numbers are limited in accord with the approximate relationship $n^n \div p$ previously mentioned, good judgment dictates a selection of $p$ limited to the smallest prime number greater than 10 so that a maximum quantity of acceptable information numbers is provided. Accordingly, $p$ is tentatively selected, for the illustrative system, to be eleven, the smallest prime number greater than 10.

Thus far a system of numbers has been derived whereby, with proper detecting means, any single-digit registration error may be detected; hence provision for the previously mentioned first group of possible errors in information number-entry has been accomplished.

The second class of possible errors in information number-entry, namely interchange or transposition of two digits, will now be considered. If two digits are interchanged, as for example, the $i$'th with the $j$'th, the error introduced in the summation defined in expression A is equal to:

$$WiDj+WjDi-WiDi-WjDj \qquad (B)$$

Again, to remain undetected, this term must be congruent to 0 and $p$. Term B may be rewritten:

$$Wi(Dj-Di)+Wj(Di-Dj)$$

or, $$Wi(Dj-Di)-Wj(Dj-Di)$$

Hence, by factoring:

$$(Wi-Wj)(Dj-Di) \qquad (C)$$

Since in accord with a previously stated desideratum, $p$ is a prime number, either one or the other of the factors of C must be divisible by $p$ for errors to remain undetected by the apparatus. That is, either the difference of the transposed digits, or the difference of the weights assigned to the positions of the transposed digits, must equal $p$. Here again, if $p$ is chosen to be greater than the highest valued digit $D$ and also greater than the highest valued weight $W$, the difference between any two weights $W$, or between any two digits $D$, must also be less than $p$, and thus the expressed product will not be divisible by $p$, with the exception that would result if either $(Wi-Wj)$ or $(Dj-Di)$ were equal to zero. But, by selection of weight values $W$, each different from the others, it is rendered impossible for $Wi-Wj$ to equal zero, and since the digits are different each from the others, $Dj-Di$ cannot be zero. Thus, the previously mentioned preference for having all of the weighting numbers $W$ different each from the others is verified, and the one possible exception to complete detection of transposition or interchange errors disposed of.

It has now been made evident that by assigning to the digit positions individual weight values each different from the others and not zero, and by selecting $p$ from among prime numbers greater than any one of the digits and greater than any one of the weight values, all single digit errors and all digit interchange (transposition) errors may be detected by means capable of detecting nonconformity with expression A. Accordingly, the previous tentative selection of eleven as a value for $p$ remains acceptable in the exemplary system using ten columns of keyboard elements.

From a practical standpoint, acceptable account or information numbers may be formed from each of existing serially consecutive account numbers by adding to each such number one or more digit positions which contain an integer, the value of the integer being so computed that the requirements of expression A are met by the thus modified account number. Alternatively, acceptable account or information numbers may be formed from existing serially consecutive account numbers by adding an integer, herein termed a check integer, which is selected to be of a value so that the requirements of expression A are met. This alternative modification may necessitate addition of a check integer greater than 9, however; and since on standard keyboards there are only digits 0 through 9, all of the serially consecutive account numbers which would require addition of a check integer greater than 9 may be discarded. This eliminates approximately one eleventh of the existing series of account numbers otherwise practical for use with a standard keyboard.

The previously mentioned third type of information number entry-error includes all the higher order errors, such as those in which two or more individual-digit errors are committed. These errors result in the exemplary checking system according to the invention arriving at a summation defined by:

$$\Sigma DiWi \equiv e \bmod 11 \qquad (D)$$

wherein $e$ is some integer 0, 1, 2, . . ., $n$. If the error is random, as it seems that complex errors are likely to to be, then $e$ is equally likely to assume any one of its possible values (eleven values, in the example). The assumption of any of ten of these eleven values would result in the error being detected, and assumption of only the remaining (eleventh) value would result in an incorrect or false acceptance of the number. Hence, $10/11$, or 91%, of all higher order errors would be expected to be detected.

Thus an apparatus capable of performing the operations indicated by expression A, and capable of determining presence or absence of a remainder upon division of the summation by modulus $p$, would be capable of detecting all single-digit entry errors, all two-digit transposition errors, and about 91% of all other number entry errors.

Apparatus for implementing operations prescribed by the expressed exemplary rule set forth in the summation defined by expression A, and according to the invention, is illustrated in the drawings and hereinafter explained in detail.

Referring to the drawings, in which a preferred exemplary physical embodiment of apparatus according to the system is diagrammatically illustrated, there is depicted in FIG. 1 a block diagram of components including a keyboard 20 and four principal apparatus components A, B, E, and F, each of which is for convenience hereinafter referred to as a register. Each register has associated therewith a respective control device or "clock" designated H, J, M, and V, respectively; and the apparatus also includes a machine control device G and associated transistor and relay means. Additionally, there is included in the apparatus, and depicted intermediate the B register and the keyboard 20, a plug board 21. The plug board, as will hereinafter be made evident, may be omitted in certain instances. Light-weight lines interconnecting and passing through the several blocks of the diagram of FIG. 1 are for the purpose of indicating the directions of specific control functions exercised by certain units of the respective apparatus components upon other units of the apparatus. The direction of the control function exercised by one component on one or more of the other components of the apparatus is indicated, in FIG. 1 only, by arrow points applied to the respective control lines. This will be made more fully evident in connection with the detailed description of apparatus operations to follow.

Keyboard 20 may be any standard machine input keyboard having a plurality of columns or keys arranged in denominational rows as is common in business accounting machines, and in this example will be illustrated as having ten columns of digit keys. The columns will be numbered 1 through 10 from right to left, and the key values zero through nine from bottom to top. Each of registers A, B, E, and F and each of the control devices H, J, M, and V, comprises one or more unique similar units each of which units is composed essentially of a bistable magnetic core and an associated transistor, the bistable magnetic core in each instance being provided with one or more windings or coils. As will hereinafter be made fully evident, a series of these units may be concatenated to form a register, or may be used individually or in groups as control devices. Since these core-and-transistor units are unique as to structure and operation, the construction and operation of a typical unit will be explained in detail in connection with FIG. 2.

Referring now to FIG. 2, there is diagrammatically depicted a representation of a bistable magnetic element or core 30 which solely for convenience of illustration is shown in the form of a rectangular ring, although the core may in practice be of toroidal or other physical shape. Threaded through the core are insulated electrical conductors or leads, such as L1, L2, L3, and L4. It will be understood that in lieu of the conductors passing but once through the core, they may in other ways be inductively linked or coupled to the core, as by being provided in the form of coils of one or more turns wound on the core. In either case, the conductors may be referred to as coils. By means of this inductive coupling, a pulse of current passing through a lead or coil may magnetically affect the core; and by producing a change in the magnetization state of the core may induce a potential or current in another coil coupled to the core. The opposite remanent magnetic states of the core will for convenience hereinatfer be referred to as "0" state and "1" state, or merely as "0" and "1." Bistable magnetic cores and their operations are now well understood in the computer art and further details concerning their construction and operation may be obtained from the voluminous prior art literature. See, for example, Journal of Applied Physics, vol. 21, No. 1, pp. 49–54, and vol. 22, No. 1, pp. 44–48 inclusive, wherein the meaning of the term "bistable," as employed in connection with magnetic elements, is explained. Core 30 has associated therewith circuitry including a transistor, T, which in this example is of low frequency P-N-P type. It will be evident to those skilled in the art that if a pulse of electric current of sufficient magnitude is passed through a coil inductively coupled to core 30, for example through lead L1, in the direction indicated by the arrow on lead L1, the core may be coerced or driven to a specific one of opposite remanent states, depending upon the sense of the winding of the coil and assuming that the core is not already in that particular remanent state. Similarly, if a pulse of current is passed through lead L1 in the direction opposite that indicated by the arrow, core 30 may be coerced or driven to the opposite remanent state if not already in that state. For convenience and sake of clarity in the description to follow, it will be assumed that passage of current through a lead and winding or coil in the direction indicated by an arrow point applied to the lead at the rectangle representing the core, will tend to coerce or drive the particular core to that specific remanent magnetic state indicated by that one of the symbols "0" and "1" at the side of the rectangle opposite the arrow point. That is, with the symbols "0" and "1" applied to the upper and lower sides of the rectangle, respectively, as indicated at the left end of core 30 in FIG. 2, a pulse passing through L1 in the "downward" direction indicated by the arrow point thereon is considered to tend to coerce or drive core 30 from "0" state to "1" state. Similarly, an electric pulse passing through a lead such as L2 in the "upward" direction as indicated by the arrow point on that lead, will tend to reversely coerce the core 30 from "1" to "0." The transistor, T, is connected in a grounded emitter arrangement, with the base and emitter terminals connected as indicated to the ends of a coil or lead L5 inductively linked to core 30. Thereby, upon passage of a pulse of current through one of the other windings or coils linking core 30, in a direction tending to change the magnetization state of the core, the core will be "excited" and a voltage will be induced in coil L5. It is evident that if the winding of coil L5 is in the proper direction, a negative potential will be applied to the base of the transistor, "triggering" the transistor into conduction. It is, of course, assumed that the transistor collector terminal is connected to a suitable grounded source of negative potential as indicated. The exciting pulse, which may, for example, be passed upwardly through lead L2, may conveniently be termed an "interrogation" pulse. If core 30 is in the aforementioned "1" state, excitation of the core and transistor by an interrogating pulse through L2 results in passage of transistor collector current "upwardly" through lead L4. This current will reverse the state of the core, that is, will "drive" or coerce the core from "1" to "0." In the several usages in apparatus according to the present invention of units like or similar to that depicted in FIG. 2, various sources of pulses or of steady current are provided for operation of the several units as will later be made apparent in connection with FIGS. 5a and 5b. Also, the change of the respective magnetic cores from one remanent state to another, induced or aided by conduction through the associated transistor, is utilized to perform control functions, counting functions, and information-bit storage and transfer functions. This is accomplished by passage of the transistor current or pulse through a suitable "load" as indicated in FIG. 2. These operations will be more fully explained in connection with FIG. 3.

Figure 3:
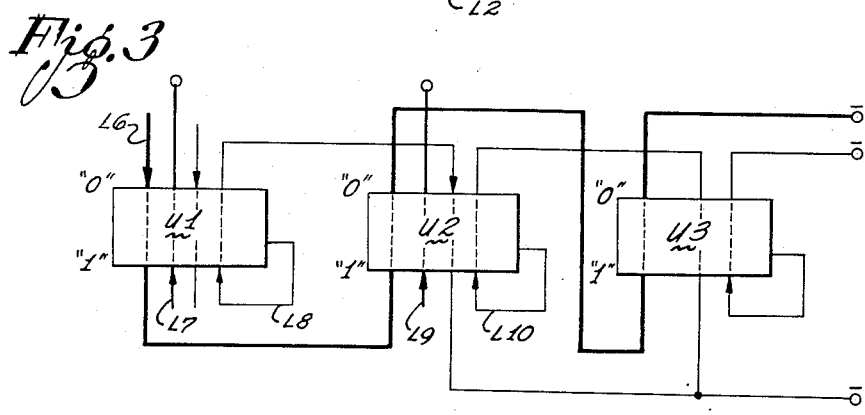
FIG. 3 is a schematic diagram illustrating how units of the nature of that depicted in FIG. 2 may be combined for sequential transfer of a control function or of a stored function or indication from one unit to another unit.

Referring now to FIG. 3, there is indicated a series of three units, U1, U2, and U3, each depicted as a respective rectangle which symbolically represents a core and transistor unit such as is depicted in FIG. 2. Electrical conductors or coils and leads, each inductively linked with a respective core, are indicated by vertical lines entering and leaving the respective rectangles; and the significant current flow directions through the respective leads are indicated by arrow points applied to the respective leads, as in FIG. 2. The two remanent states of the cores are represented by the symbols "0" and "1" set down at the left ends of the individual rectangles, and it will be understood that current flow through a lead in an "upward" direction flows through the associated coil in such a direction as to tend to coerce the respective magnetic core from "1" to "0"; and similarly current flow through a lead in a direction indicated by a downwardly directed arrow point will tend to coerce a core from "0" to "1." As will be apparent, current through a selected lead may concurrently flow "downwardly" through one unit and "upwardly" through a second unit, to coerce the first core to "1" and the second core to "0." The second unit may be comprised in the "load" described in connection with FIG. 2. Assuming now that respective coils of each of the three cores of units of FIG. 3 are serially connected in a manner indicated by lead L6 and that a current pulse is supplied through the lead in the direction indicated, it will be evident that the magnetic core of unit U1 will be coerced from "0" to "1" if not already in "1," that the magnetic core of unit U2 will be coerced from "1" to "0" if not already in "0," and that the magnetic core of unit U3 will similarly be coerced from "1" to "0" if not already in "0." Further, it will be evident that the aforementioned current pulse, which hereinafter may be referred to as a "setting" pulse, may be passed through additional coils linking the respective magnetic cores of additional units, if desired, to drive or coerce the cores thereof from "1" to "0" if not already in the "0" state, whereby assurance may be had that the core of the first unit is in the "1" state and that all succeeding cores of a series are in "0" state, or vice versa, according to the winding arrangement.

If, now, with the cores of units U1, U2, and U3 in their respective magnetic states as established by the setting current through lead L6, a current is passed through another coil inductively related to the core of unit U1, but in a direction tending to drive that core from "1" to "0" (as indicated by the current through lead L7), it is evident that unit U1 will be excited and the transistor of the unit will be excited or triggered into conduction by a voltage induced in its emitter-base coil; and that the collector current pulse from the transistor will pass "upwardly" through the coil connected to lead L8. Also it will be evident that the transistor pulse, possibly aided by the initial triggering pulse through lead L7, will drive or coerce the core of unit U1 from "1" to "0," thus returning that core to "0" state. Further, since lead L8 is connected to pass the transistor current "downwardly" through a coil inductively linked to the core of unit U2, it is evident that the pulse will also be effective to concurrently drive the core of unit U2 from "0" to "1." Thus in effect, the information "bit" originally entered in the core of U1 and represented by that core existing in the "1" state, has been shifted to the core of U2. It is in this manner that the apparatus of the present invention operates to perform what is known in the art as a bit-shifting operation. In addition to serving as a bit-shifting operation in a register, the previously explained actions of certain of the typical core-and-transistor units are utilized for control actions in a manner hereinafter made fully evident.

In FIG. 4 there is schematically shown a series of units, Z1, Z2 . . ., Z7, each similar to the units previously explained in connection with FIGS. 2 and 3. The units are serially concatenated to provide a "shift register," into which an information bit may be entered at unit Z1 by a "setting" pulse passed through a setting lead L12, and thereafter shifted successively from one unit to the next by application of appropriate exciting pulses to interrogating windings or coils such as L13, L15, L17, etc. The exciting or interrogating pulses may be applied to all of the cores of the series concurrently, or to only the particular bit-storing core, depending upon whether the exciting coils are connected in series or otherwise. In either case, only the transistor of the unit in the active or "1" state is triggered into conduction. This is evident when it is noted that an exciting pulse applied to a unit in "0" state will not induce a triggering potential in the base-emitter coil of the transistor. While in the arrangement shown in FIG. 3, an information bit may be shifted through the device from U1 to U2, from U2 to U3, and then out of U3 and lost or discarded, the arrangement in FIG. 4 is such that the bit is recirculated through the register. This is effected by connecting the transistor of unit Z7 to pass its collector current "upwardly" through a coil on the core of Z7, and then "downwardly" through a coil on the core of Z1 via lead L24, whereby as the core of Z7 is returned to "0," that of unit Z1 is driven to "1." The connections including lead L24 for effecting this recirculating operation are as illustrated in FIG. 4.

In the organization of the exemplary apparatus as depicted in functional block form in FIG. 1, the B register is utilized for a functional operation hereinafter referred to as keyboard scanning, the A register is utilized to control the numerical "weighting" of the several columns of the keyboard, the F register is utilized as an accumulator register into which the numerical values of the numbers entered on the keyboard are introduced (in effect) by successive shifts of a bit through a corresponding number of register units. The entry of numerical values into the accumulator (F) register is controlled by the E register, which may hereinafter be referred to as the keyboard input register. In general, the thus outlined components of the apparatus operate to introduce into the accumulator (F register) the numerical value of the depressed key in any given column of the keyboard one or more times, the number of times corresponding to the numerical value of the weight specified for that particular column of keys. For example, if the first column of keys is weighted 1, the second column 2, the third column 3, and so forth, the apparatus is effective to enter into the accumulator register the numerical value of the depressed key in the first column but once, the value of the depressed key in the second column twice, that of the depressed key in the third column three times, and so on, whereby there is in effect entered into the accumulator (F) register each of the products of the numerical values of the several depressed keys and their respective column weights. Actually, the numerical values are not introduced into the accumulator in such simple order, as will hereinafter be made evident.

The accumulator (F) register is a "recirculating register" in which initially a single digit or bit (of numerical value equal to the number 1) is entered and recirculated, hence each time a decimal numerical value is introduced into the accumulator register this single digit or bit is shifted a number of steps equal to the decimal value being thus introduced into the register. Therefore, if the accumulator register is composed of a number of stages or units equal to the aforementioned modulus, then upon termination of the operation of feeding into the accumulator all of the aforementioned products, the single digit or bit in the accumulator will, providing the information number has been correctly entered on the keyboard of the machine, be located in a pre-determined single specific one of the accumulator register units. Hence, presence or absence of the digit in that particular unit of the accumulator register is indicative, respectively, of correct or incorrect entry of the account number on the keyboard of the machine, and simple interrogation of that unit will provide the needed indication of accuracy of number entry. The specific manner in which the apparatus operates to perform the aforesaid generally described operations will now be described in connection with FIGS. 5a and 5b.

Referring to FIGS. 5a and 5b, it is noted that the A register comprises ten units, respectively designated A1, A2, . . ., A9, A10. The B register comprises eleven units, respectively designated B1, B2, . . ., B10, B11. The E register comprises eleven units, respectively designated E10, E9, E8, . . ., E2, E1, E0; and the F (accumulator) register comprises eleven units similarly designated F11, F10, F9, . . ., F3, F2, F1. It will be noted that each of the units of the registers has its transistor collector circuit (such as lead 41 of unit A1 or lead 51 of unit B1) connected to pass the collector current "upwardly" through a coil on the core of that unit so that the collector current will drive the core of that unit from "1" to "0." The individual transistor collector currents, in the nature of brief current pulses, are in each instance also used to excite one or more cores of other units, or for other control functions, as will presently be made apparent. A setting lead LS (heavy line) is inductively coupled to the core of each of the units of the four registers, and to the core of each of control devices J and G. A setting pulse is passed through this lead by closure and opening of a switch LSS (at the upper left in FIG. 5a) by the keyboard machine each time an account number has been entered on the machine keyboard. As indicated by the arrow points on lead LS, the setting pulse passes through the respective units in directions so that the cores of units A1, J, B1, and F1 are coerced or "flipped" to "1"; and the cores of the remainder of the units of registers A, B, and F, and all the cores of the units of register E, are driven to "0."

A bias lead LB (upper right of FIG. 5b) is inductively coupled to the cores of devices H, J, M, and V, and is continuously energized in a direction to normally bias those cores to "0," as indicated. The circuit elements are such that when the setting pulse is passed "downwardly" through a coil of device J, for example, the bias is overcome and the core is thereby temporarily coerced or "turned" from "0" to "1." Upon termination of the setting pulse the bias reversely coerces or "restores" the core to "0." This same operation of temporary turning of a core from "0" to "1" and return to "0" by the bias, occurs in instances in operations of devices H, M, and V, each of which has a bias-current coil, as will presently be made evident.

It is apparent from the preceding description that the units in any one of the registers may transfer a "bit" (or the equivalent ability to perform a control function) to the next unit of the register, and concurrently initiate an action of a unit in a different register or in a control device; and that such action ensues as soon as the core of the first unit (which must be in "1") is excited and the transistor thereof conducts. The several interconnections and leads required are arrayed in FIGS. 5a and 5b, and will be referred to in some detail in connection with an explanation of a complete cycle of operations required to verify or reject as incorrect a ten-digit account number entry on keyboard 20. The keyboard is shown as comprising horizontal row leads KR0, KR1, . . ., KR8, KR9; and vertical column leads KC1, KC2, . . ., KC9, KC10. Each key is provided with a switch which, when the key is depressed, connects its respective row lead with the respective column lead. The keys are symbolically represented by the intersections of the row leads with the column leads; and depressed keys will be indicated by an "X" mark superposed on the appropriate intersections of leads.

Plug board 21 is merely two rows of ten terminals each, herein serially numbered from P1 through P10 in the upper row and P11 through P20 in the lower row, and so arranged that any number terminal in the first row may be connected to any number terminal in the second row, for cross-connection purposes in "weighting" the columns of the keyboard. This permits different weighting arrangements by differently cross-connecting terminals, as will presently become evident. In the present example, the first plug board input terminal, P1, is connected to the tenth output terminal, P11, input terminal P2 to output terminal P12, input P3 to output P12, etc., for the purpose of weighting the keyboard columns with the values previously indicated, that is: column one (KC1), weight 1, column two (KC2), weight 2, etc. Further, in this example, it will be assumed for explanatory purposes that the information number 5254975113 is supposed to have been entered on the keyboard of the machine as an account number to be checked by the apparatus, but that actually the number 5254975013, as indicated by the keyboard, was erroneously entered.

For convenience in explaining apparatus operations, the transistor of a specific unit of one of the registers or devices will be designated by the letter T followed by the symbol designating that unit or device. For example, the transistor of unit B6 will be designated TB6, that of device J by TJ etc. Also for convenience, units or devices may hereinafter be referred to by only the designating symbol. As previously indicated, the bias applied on H, J, M, and V normally holds those units in "0" state. Passage of the setting pulse through lead LS coerces or "sets up" A1, B1, and F1 to "1" state, thus storing a bit or digit and an ability to exercise a control function in each of those units. Also the setting pulse overcomes the bias on J and "turns" that device to "1" against the bias. At the termination of the setting pulse, J returns to "0" by virtue of the bias, and TJ is triggered into conduction. The TJ pulse (the output or collector current pulse from the transistor of unit J) passes through lead 52 which is inductively linked, in the sense indicated, to each of the cores of the B register. The TJ pulse has no effect on the cores of units B2, B3, . . ., B10, B11, since those cores are in "0" state, that is, are "0"; however the pulse excites the core of B1 and triggers TB1, since B1 is in "1" state. Hence TB1 conducts a pulse, termed a TB1 pulse, which passes by way of lead 51 upwardly through B1 (returning B1 to "0"), passes on "downwardly" through B2 (turning B2 to "1"), on through P1 and P11 of the plug board to first column lead KC1 of the keyboard, through the switch of the depressed "three" key of that column, out through row lead KR3, downwardly through unit E3 to a common lead 53 (turning E3 to "1"), on and downwardly through M, temporarily turning the core of unit M to "1" against the bias. Upon termination of the TB1 pulse, the bias returns M to "0," thus triggering the transistor, TM, of that device. TM conducts and the TM pulse, directed through lead 54, passes "upwardly" through device G (but not exciting the core nor affecting TG since G is already in "0" state) and, continuing on, passes "upwardly" through all the units E0, E1, . . ., E10 of the E register. This TM pulse affects only unit E3 (which was previously turned from "0" to "1" by the TB1 pulse), since all the E register units except E3 are already at "0." The TM pulse thus excites E3 and triggers TE3, and the latter conducts a TE3 pulse which, flowing in lead 55, passes upwardly through E3 (returning E3 to "0"), downwardly through E2 (turning E2 from "0" to "1"), through a common lead 56, on and "downwardly" through V and thereby temporarily turning V from "0" to "1" against the normal bias provided through lead LB. Upon termination of the TE3 pulse, the bias returns V to "0," causing transistor TV of device V to conduct. The transistor thus produces a TV pulse which, directed on lead 57, passes "upwardly" through all of the F register units. Since the setting pulse previously set all F units except F1 to "0" and left F1 in "1" state, only F1 is affected by the TV pulse. That pulse, passing via lead 58 upwardly through F1, reverses the latter to "0," and, continuing on and passing downwardly through F11, turns F11 from "0" to "1" (and thus transfers the digit previously stored in F1 from that unit to F11). Continuing on, the TF1 pulse flows through a common lead 59 to device M where, passing downwardly through M, it temporarily turns M to "1" against the normal "0" bias on that device. As the TF1 pulse decays, the bias returns M to "0," thereby causing TM to conduct another TM pulse. This pulse, flowing via lead 54 through all of the E units, again "interrogates" all the E units but excites only E2 (which was previously turned to "1" when E3 was turned to "0"). E2 having been thus excited, TE2 conducts a pulse which courses upwardly through E2 and downwardly through E1 into common lead 56 (thereby returning E2 to "0" and turning E1 to "1"), and continuing on, downwardly through V as did the TE3 pulse, temporarily again turns V to "1" against the bias. As the TE2 pulse decays, TV again pulses and the pulse again passes through and interrogates all of the cores of the F register; and finding only F11 in the active or "1" state, excites TF11 into conduction. The resultant TF11 pulse returns F11 to "0" and turns F10 to "1" (thus shifting the digit from F11 to F10) and, continuing through common lead 59, temporarily coerces or "flips" M from "0" to "1" against the bias. As the TF11 pulse subsides, M again returns to "0." TM then again pulses, the TM pulse interrogates the E register, this time finds E1 active (that is, in "1" state) and causes TE1 to pulse. The TE1 pulse returns E1 to "0," turns E0 to active state ("1") and, coursing along lead 56 downwardly through V, temporarily flips V to "1." The previously detailed action of TV again "interrogating" the F cores and shifting the digit is repeated, the digit this time being shifted from F10 to F9, and M is again temporarily forced to "1" against the bias. M then returns to "0," and TM pulses and thus interrogates the E registers, wherein only E0 is active. TE0 then conducts (pulses); but it will be noted that the TE0 pulse (from the last or lowest unit of the E register) does not interrogate the F register. Rather, in effect, the TE0 pulse, passing upwardly through E0, clears the E register, and continuing on through device J, announces to J that the entry of the first column numerical value (3) has been entered into the accumulator. This entry was effected in three steps, viz: (1) shift of the bit or digit from F1 to F11, (2) shift of the bit from F11 to F10, and (3) shift of the digit from F10 to F9. This entry of the first column depressed-key value into the accumulator having been announced as completed by the conduction of TE0, the apparatus proceeds to enter the numerical value of the depressed key in the second column. This is accomplished under the control of device J in the following sequence of events which are quite similar to those explained in connection with entry of the first column value.

The announcement by the TE0 pulse of completion of entry of the first column value results in device J being temporarily forced from "0" to "1" against the bias. This action at device J is similar to that at the commencement of actions by the original (setting) pulse which also temporarily forced J from "0" to "1." However, in other respects, the action is not the same, since the TE0 pulse does not affect any units other than E0 and J (and hence leaves F9 active in "1" state and representing entry of a count of three), and leaves B2 active rather than B1 as was the case at the termination of the setting pulse. As J is returned to "0" by the bias, at the termination of the TE0 pulse, TJ pulses, the pulse coursing over lead 52 and interrogating each of the B register units. Since only B2 is active, TB2 is triggered into conduction. The resultant TB2 pulse, coursing lead 61 upwardly through B2 and downwardly through B3, reverses the state of both those units and thereby transfers control function capability from B2 to B3. The TB2 pulse also passes through the plug board terminals P2, P12, on down the keyboard second column lead KC2, through the switch of the depressed key (in the example, the "one" key), out through keyboard row key KR1, and downwardly through unit E1, through common lead 53 and downwardly through unit M. Thus this pulse, by making unit E1 active, enters into the E register the capability or power to insert into the F (accumulator) register the numerical value of the depressed second column key. Obviously, if the "six" key of the second column had been depressed, the TB2 pulse would have coursed down leads 61 and KC2, but would have come out the keyboard matrix through the KR6 row lead and would have activated unit E6, thus giving the E register the power or ability to enter six successive "ones" into the accumulator. However, since the second column key depressed was the "one" key, unit E1 was turned from "0" to "1" and thus rendered active. As previously, the B register pulse (the TB2 pulse) temporarily reversed unit M against the bias, and upon termination of that pulse, M is returned to "0," and TM pulses through lead 54 and again interrogates the E register. E1 is found by this interrogation to be the only active E unit, and TE1 conducts, returning E1 to "0" and changing E0 to active state and operating unit V against the bias. Devices V and M thus operate in a now evident manner, TV in this instance finding F9 active and initiating the shift of the stored digit from F9 to F8. This shift is, in effect, the entry of the second-column numerical value (one) into the accumulator. As the digit is shifted from F9 to F8 by a TF9 pulse, M is again activated, and again interrogates the E register in the previously detailed manner. This interrogation finds E0 active and results in the E register again emptying itself and, through a TE0 pulse, again announcing completion of accumulator entry of a depressed key value by again activating device J. Then, in response to its return to "0" by the bias, J again interrogates the B units via lead 52, finds B3 active this time, and initiates action of B3. This is followed by B3 returning to "0," B4 going to "1" and the third column of the keyboard being "searched" by the TB3 pulse. Search of the third column of the keyboard finds the zero key switch closed (erroneously, as previously indicated), so the TB3 pulse courses out the zero row lead KR0 of the keyboard and activates E0 and M. Obviously, no digit is to be entered in the accumulator at this time (since the "zero" key is depressed); and none will be, since when the E register is interrogated by the TM pulse, only E0 is found to be active. The result is that E0, in effect, announces to device J that a zero (absence of a "one") has been entered into the accumulator, and J is made active again.

Device J then again interrogates the B register, finds B3 active, and in the previously detailed manner, initiates transfer of function control ability from B3 to B4 and search of the fourth keyboard column by a TB3 pulse. The latter pulse, finding the "five" key down, courses out row lead KR5 and activates E5 and M. M then interrogates the E register six times in cyclical operations of units M and V in a sequence now obvious, inserting a single "one" into the accumulator each of the first five operations and in the sixth operation again causing E0 to clear the E register and activate J.

It is now evident that J again interrogates the B register, that B4 is found active and that B4 transfers its control function ability to B5 while searching column 5 of the keyboard; and that E7 is thereby made active, and that thereafter M and V operate through repetitive cycles to enter seven successive ones (representing the "seven" entered by the depressed fifth column key of the keyboard) into the accumulator. Also it is evident that entry of the first column value (three) into the accumulator left F9 active, that following entry of the second column value (one), F8 was left active, that following entry of the third column value (zero) F8 remained active, and that following entry of the fourth column value (five) F3 was left active. Hence, following entry into the F register of two single "ones" of the seven "ones" representing the fifth column value, the total accumulated to that time (3+1+0+5+2=11), was divided by eleven and the third "one" of the seven entered in unit F11 by the aforedescribed recirculation operation of the F register. Similarly, it is evident that following entry into the accumulator of the "seven" value of the fifth keyboard column by the repetitive actions of units M and V, unit E0 again clears the E register and causes unit J to again operate. Thereafter, by a now evident procedure, the values of the depressed keys in the sixth, seventh, etc., columns of the keyboard are successively entered into the accumulator by successive entries of nine, four, five, two, and five, each in steps of single ones. Further, it is evident that each time a total of eleven ones has accumulated in the F register, the total is divided by eleven as the single digit is shifted from F1 to F11. However, it will be noted that at the time the last "one" of the five value represented by the depressed key of the tenth keyboard column has been entered into the F register, each of the depressed key values has been weighted by only one. That is, each of the depressed key values has been, in effect, multiplied by one, and the products all entered into the accumulator and divided by eleven. There remains to be accomplished, then, the operations of again entering a single time each of the depressed-key values except that of the first column, followed by again entering a single time each of the depressed-key values except those of the first and second columns, followed by again entering a single time each of the depressed-key values except those of the first, second and third columns, etc., until, finally, there has been entered into the accumulator the first column value once, the second column value twice, the third column value three times, etc., and the tenth column value ten times; whereby the individual column values will have been entered a number of times corresponding to the particular weight applied to the respective column. As a specific example, with the columns weighted as before noted, column one-weight 1, column two-weight 2, etc., the value of nine represented by the depressed key of the sixth keyboard column must be inserted into the accumulator register six times, whereby the "nine" is in effect multiplied by six, its respective column weight. The continuing automatic actions of the apparatus to perform the discussed operations will now be explained, it being evident that in the sequence of apparatus actions thus far set forth, the entire keyboard has been "scanned" from right to left only one time and B11 left in active or "1" state (as a result of the search of column 10 by the TB10 pulse) and E0 signaling the entry into the cacumulator of the last "one" of the "five" entered by the tenth column depressed-key.

As TE0 announces or signals completion of entry of the tenth column value into the register, J is activated and as the bias returns J to "0," TJ again interrogates the B register and finds only B11 active. TB11, as a result of the interrogation, announces completion of the first "scan" of the keyboard, that is, completion of entry of all depressed-key values, each weighted by 1, into the accumulator. The announcement is made by TB11 conducting a pulse which, coursing upwardly through TB11 via lead 71, clears the B register and, continuing on and passing downwardly through control device H, temporarily brings H to "1" state. At expiration of the TB11 pulse, H is returned from "1" to "0" by the bias acting through lead LB, and as a result TH conducts a pulse through lead 72 and thereby interrogates the A register. Only A1 is found active (A1 was set to "1" by the original setting pulse and has until this sequence remained in "1"), and accordingly A1 is excited by the TH pulse, and TA1 conducts. The TA1 pulse, coursing along lead 41 upwardly through A1 and downwardly through A2, transfers the keyboard scanning control function from A1 to A2; and the pulse, continuing downwardly through B2 and into common lead 72, coerces B2 to active state and thus precludes any subsequent search of the first keyboard column through action of B1. The TA1 pulse continues, coursing common lead 72, and passes downwardly through device J. Thus by this reactivation of J, a second scan of all the keyboard except the first column is instituted as the TA1 pulse decays and J is returned to "0" by the bias. TJ conducts and the TJ pulse interrogates the B register as during the preceding scan cycle, but in this second keyboard scan it commences with unit B2 rather than with B1 (since B2 is now the initially active unit of the B register). The TJ pulse excites B2, TB2 conducts, and the TB2 pulse transfers the active status from B2 to B3, searches the second column of the keyboard, finds the one-key down, and so activates E1 and institutes the second entry of the one into the accumulator. Thereafter, the numerical values of the depressed keys in the third, fourth, etc. columns are successively entered into the accumulator for the second time, in a manner now evident from the previous description.

Upon conclusion of the second scan of the keyboard and the second entry of the numerical values of the depressed keys of the second through the tenth columns, B11 announces the fact by producing the second TB11 pulse. The latter pulse activates the control device H for the scan-control register A in the previously described manner, after which TH again interrogates the A register, finds A3 active and initiates a new sequence of actions covering the third entry of all the depressed-key values of the third and higher columns of the keyboard. Thus each of those values is given another "one" of weight, for a total weighting of three. At the conclusion of this third "scanning" of the keyboard, the sub-cycle of operations is repeated, scan-control unit H this time finding A4 active and hence initiating the scan at the fourth column of the keyboard. It thus is evident that all depressed-key values in the fourth and higher columns of the keyboard are again entered in the F register and bringing their total weighting to 4. The scanning subcycles are repeated in the manner now evident, with another column of the keyboard dropped at each scan, until on the tenth scan only the highest (tenth) column of the keyboard is included.

From the foregoing it is evident that the accumulator register has at the conclusion of the keyboard scanning received by a process of successive entries of single ones, a total or sum equal to the sum of all the products of the individual depressed-key values multiplied by their respective column weights. Also it is evident that the accumulator register, through recirculation of the original bit entered therein has effectively divided the accumulated total by the modulus 11. Also it will be noted that if the accumulated total or sum has been evenly divisible by modulus 11, the digit or bit originally inserted in the F1 unit by the setting pulse will again be vested or located in that unit. Hence interrogation of that unit will suffice to determine whether the number actually entered on the machine keyboard is a valid account number, that is, conforms to the original expression A. To perform this interrogation, the pulse signaling the termination of the tenth scan of the keyboard is employed. It is evident that when TE0 signals entry of the last "one" of the tenth-scan entry of the depressed-key value of the tenth keyboard column, the TE0 pulse temporarily activates unit J, whereupon TJ pulses and interrogates the B register and, finding B11 active, triggers TB11. The latter pulses, temporarily activating unit H, whereupon TH pulses and interrogates the A register units. The TH pulse finds only A10 active, hence TA10 is triggered and pulses. This pulse, coursing upwardly through A10 via lead 81, clears the A register and, continuing via lead 81, interrogates F1 and continuing on, forces unit G from "0" to "1." Now if the bit or digit is not existent in F1 as expected, no further action occurs and the machine is not permitted to continue operations, as will presently be explained. However, if the bit or digit is present in F1 (indicated by F1 being in "1" and indicative of keyboard entry of a valid account number), the interrogating TA10 pulse excites F1 and triggers TF1. Thereupon the latter transistor pulses, and the TF1 pulse, coursing through leads 58 and 59, temporarily activates unit M, whereupon TM pulses. The TM pulse, coursing on lead 54, interrogates unit G, finds that unit active due to the action of the immediately preceding TA10 pulse, and excites unit G. The transistor TG of that unit then conducts, and the pulse, coursing on lead 91, and passing through load resistor GLR, applies a triggering voltage through resistor RCR to transistor TRC and causes the latter to conduct a current through lead 92 and the coil of relay RY. The current from TRC, flowing through the coil of RY and resistor RYR, provides a potential which continues to hold TG conductive after expiration of the TM pulse, the holding potential being applied to the base of TG via resistor HPR. Thus, if RY is energized, the transistor circuitry is, in effect, "latched" in operation and the machine is permitted, through conventional means, to utilize (register) the entered number and continue operation. If the relay remains unenergized, a warning signal light or other alarm remains activated and the machine remains in a locked condition, preventing utilization of the entered number. Thereafter, clearing of the keyboard and entry of an acceptable number is required.

In the preceding detailed operations it was assumed, for illustrative purposes, that the number 5254975013 was erroneously entered on the keyboard instead of the correct account number 5254975113. Due to the error in the third column entry, the accumulator operations terminated with the digit in unit F4; and accordingly the interrogation of F1 by the TA10 pulse did not result in a TF1 pulse activating device M. As a result, relay RY was not operated, leaving the machine locked and a warning light illumined. Upon clearing the keyboard and correct entry of the account number, the apparatus operates exactly as previously described except that at each of the first three keyboard scans, the E1 unit is activated by the third-column search (rather than the E0 unit as before); and consequently three additional ones are entered into the accumulator. Hence with the correct account number entered, the register operations terminate with the digit in unit F1, and this permits normal operation of devices M and G, transistor TRC, and relay RY to permit continued operation of the machine.

In the preceding description of the apparatus and its operation, it has been assumed that the leads extending from the individual transistor collectors were either connected (or connectible in certain cases) to the negative pole of a source of electric current whose positive pole was grounded. This is diagrammatically indicated in the drawing by the negative (−) symbols applied at the termination of the respective leads. Also, as is well known, the ampere-turns required to overcome the bias in devices H, J, M, and V is greater than the ampere turns required for the bias, hence circuit elements of appropriate characteristics are selected, in accord with known principles of electronic design, to accommodate the particular magnetic cores used in the apparatus. Due to the rapidity of core "turnover" and transistor action, the entire checking operation, performed with the largest combination of the maximum values permissible, is effected in a time interval of the order of fifteen milliseconds. Hence the apparatus does not slow normal machine operations.

It is evident that the physical apparatus of the exemplary embodiment can easily be arranged to accomodate checking of numbers according to the modified expression:

$$\sum_{i=1}^{i=n} DiWi \equiv q \bmod p \qquad (AA)$$

similar to expression A but providing for a definite remainder $q$ after division of the sum of the products by modulus $p$. In expression AA, $q$ is any selected whole integer between 1 and $p$. To accommodate the check of any account number of a system of numbers conforming to the requirements of expression AA it is only necessary that the interrogation by the TA10 pulse be directed to the selected specific one of the F register units. For example, if $q$ is selected as 1, indicating a remainder of one after division by modulus $p$, then the TA10 pulse should interrogate unit F11 rather than F1. This may be done by directing the pulse along the dash-line course indicated as leads 93 and 94, rather than through F1. Similarly, if $q$ were selected as 5, the TA10 pulse would be directed through the F7 unit. Thus it is seen that the exemplary apparatus is capable of simple adaptation to an entire family of systems of account numbers.

It is evident that in instances it may be desirable to use systems of information numbers of nine or fewer digits each, in, for example, the exemplary ten-column keyboard. For this purpose, any one or more of the columns of the keyboard keys and switches may, in effect, be nullified or rendered of no consequence in a checking operation, by the simple expedient of routing the B-register pulse or pulses corresponding to the column or columns to be nullified through the E0 unit, rather than through the keyboard switch. This has the effect of weighting the column or columns to be nullified by a value of zero. As an example, if it were desired to use only six-digit account numbers, columns 7 through 10 would be nullified by breaking the plug board connections between P7—P17, P8—P18, P9—P19, and P10—P20, and connecting P7, P8, P9, and P10 to a "nullifying" lead 96 which then leads the TB7, TB8, TB9 and TB10 pulses through E0 via the KR0 row lead, whereby the B register search of the columns in question becomes a nullity. Thus it is seen that any desired columns of the keyboard may be removed from the account number configuration.

From the preceding description of an exemplary system of numbers and apparatus utilizing a standard machine keyboard used for calculating in the decimal arithmetic system, it is apparent that the rule is operative within any selected arithmetic system. For example, the rule is operative in the hexadecimal, octal, ternary and binary arithmetic systems. Further, it is operable in any limited portion of such systems provided the portion includes two or more different numerical values. For example, it is operable over that segment of the decimal arithmetic system including only the digits or values 5 and 6, which are comprised in the series of consecutive numbers $r$, $r+1$, ..., $s-1$, $s$ (which in the decimal system may be selected as 1, 2, ..., 8, 9). Obviously also the rule is operable where it is desirable that only a portion of the available keyboard columns be used as the significant part in entry of an account number, as, for example, when the account numbers are of only $n$ (for example, five) digits and the keyboard has $m+n$ (for example, six plus five, or eleven) columns of keys. Also, it is immaterial which of the columns are utilized for entry of the informationally significant digits, it being evident that, for example, the third through the seventh columns, or the second, fourth, sixth, eighth, and tenth columns, could be utilized as the significant columns in an eleven column keyboard. Obviously, too, the system is operable with keyboards which have, in addition to number keys, keys representative of other information, such as alphabetical characters. Further the system is operable where the numerical or digital characters are assembled with alphabetical or other characters in arrays or rows included in a matrix of rows and columns of keys, it being required only that a selected number, $n$, of the positions in each array be devoted to informationally significant digital characters, and that these significant columnar or digital positions be the same in each array of a selected information number system.

In the light of the preceding detailed disclosure of exemplary systems of numbers and apparatus according to the invention and explanations of the adaptability of the system to other than decimal arithmetic and keyboards, it will be evident to those skilled in the art that changes and modifications may be made without departing from the spirit and concept of the invention; and accordingly it is not desired to be limited to the exact details of the examples described.

What is claimed is:

1. A number checking system adapted to check the correctness of entry on the keys of a keyboard having keys arranged in a matrix of $s-r+1$ rows and at least $n$ columns, of any $n$-digit information number conforming to the rule $$\sum_{i=1}^{i=n} DiWi \equiv q \bmod p$$

wherein $n$ is the number of significant digit positions in each information number, D represents a numerical value exclusive of zero selected from the series of successive whole number numerical values, $r, r+1, \ldots, s-1, s$ and of which there may be as few as two and which numerical value may be different in different digit positions, W represents a whole-number column-weight value and is not zero and is different for each of the $n$ significant positions, $p$ is a prime number greater than any D and greater than any W, and $q$ is a selected whole number less than $p$, said system comprising: a keyboard including at least $n$ columns of keys, each of the $n$ columns being assigned an individual respective one of said weight values W, and each key having a key-operated switch and the respective rows of keys being assigned an individual one of consecutive values comprised in the series of values $r, r+1, \ldots, s-1, s$; means comprising a recirculating register having $p$ stages each comprising essentially an asynchronously operable unit comprising a bistable magnetic core with windings and a transistor connected to pass current through a core winding upon triggering of the transistor, and having at any time only a single digit stored therein in a selected stage and shiftable repeatedly therethrough in stage-to-stage steps each representing an addition of one to an accumulative total; and means rendered effective by closure of a key-operated switch in each of said $n$ columns to shift said digit in said register through stage-to-stage shifts equal in number to the sum of the products of the column weights of the respective depressed keys in said $n$ columns multiplied by the respective numerical values of the depressed keys, whereby if the number entered on the keyboard by the depressed keys in said $n$ columns conforms to the aforestated rule said digit will at the conclusion of said shifting repose in a stage $q$ stages removed from said selected stage and thus verify entry of a number conforming to said rule.

2. A system according to claim 1, wherein $q=0$.

3. A system according to claim 1, wherein $q=0$ and $r=1$ and $s=9$.

4. A system according to claim 1, wherein $q=0$ and $r=1$ and $s=9$ and $p=11$.

5. A system according to claim 1, wherein $q=0$ and $r=1$ and $s=9$ and $p=11$ and $n=10$.

6. A system adapted for checking the correctness of entry on the keys of a keyboard having keys arranged in a matrix of rows and columns, of any $n$-digit information number conforming to the mathematical rule $$\sum_{i=1}^{i=n} DiWi \equiv 0 \bmod p$$

wherein $n$ is the number of informationally significant digit positions in each information number and is equal to or less than the number of columns of keys, D represents a numerical value other than zero selected from the series of successive whole-number values $r, r+1, \ldots, s-1, s$ and of which there may be as few as two different values and as many as there are rows of number keys and which numerical values may be different in different digit positions, W represents a whole-number weight value other than zero and is different for each of the $n$ significant digit positions in an information number, $p$ is a prime number greater than any D and greater than any W, said system comprising: a keyboard including $m+n$ columns of keys where $m$ may be zero, each of the $n$ columns having an individual assigned respective one of said weight values W, and each key of said $n$ columns of keys having a key-operated switch and the respective rows of keys of said $n$ columns being assigned a respective numerical value from consecutive values comprised in the series of values $r, r+1, \ldots, s-1, s$; means permitting closure of but one switch at a time in each of said $n$ columns of key-operated switches; asynchronously operable means, including a recirculating accumulator register having $p$ stages, each stage consisting essentially of a bistable magnetic device having electric conductor means inductively linked therewith and an associated transistor so connected to the conductor means as to be triggered into conduction incident to magnetic change of a selected type induced in the respective magnetic device, and the transistor also being so connected to the conductor means as to conduct current tending to continue the magnetic change when so triggered, and said $p$ stages having at any time a single digit only stored therein in a selected stage and shiftable repeatedly therethrough in stage-to-stage steps each representing an addition of one to an accumulative total; and means rendered effective by closure of a respective key-operated switch in each of said $n$ columns to shift said digit in said register through stage-to-stage shifts equal in number to the sum of the products of the column weights W of the respective depressed keys in said $n$ columns, multiplied by the numerical values of the respective depressed keys; whereby if the number entered on the keyboard by the depressed keys in said $n$ columns conforms to the aforestated rule said digit will at the conclusion of said shifting repose in said selected stage and thus verify entry of the number conforming to said rule.

7. A system adapted for checking the correctness of entry on the keys of a keyboard having keys arranged in a matrix of rows and columns, of any $n$-digit information number conforming to the mathematical rule.

$$\sum_{i=1}^{i=n} DiWi \equiv q \bmod p$$

wherein $n$ is the number of informationally significant digit positions in each information number and is equal to or less than the number of columns of keys, D represents a numerical value other than zero selected from the series of successive whole number numerical values, $r, r+1, \ldots, s-1, s$, and of which there may be as few as two different values and as many as there are rows of keys and which numerical values may be different in different digit positions, W represents a whole-number weight value other than zero and is different for each of the $n$ significant digit positions in an information number, $p$ is a prime number greater than any D and greater than any W, and $q$ is any selected whole number less than $p$, said system comprising: a keyboard including at least $n$ columns of keys, each of the $n$ columns being assigned an individual respective one of said weight values W, and each key having a key-operated switch and the respective rows of keys being assigned an individual one of consecutive values comprised in the series of values $r, r+1, \ldots, s-1, s$; means permitting closure of but one switch at a time in each of said $n$ columns of key-operated switches; asynchronously operable means, including a recirculating register having $p$ stages each of which stages comprises essentially a bistable magnetic device and a plurality of electrical conductors each inductively linked to the magnetic device and each stage also comprising a transistor so connected to at least two of the said electrical conductors that the transistor is triggered into conduction incident to magnetic change of a selected type in the magnetic device and also so connected that current conducted by the transistor is effective to continue said magnetic change, and said register having at any time only a single digit stored therein in a selected stage and shiftable repeatedly therethrough in stage-to-stage steps each representing an addition of one to an accumulative total; and means rendered effective by closure of a key-operated switch in each of said $n$ columns to shift said digit in said register through stage-to-stage shifts equal in number to the sum of the products of the column weights of the respective depressed keys in said $n$ columns multiplied by the respective numerical value of the depressed keys, whereby if the number entered on the keyboard by the depressed keys in said $n$ columns conforms to the aforestated rule said digit will at the conclusion of said shifting repose in a stage of said register $q$ stages removed from said selected stage and thus verify entry of a number conforming to said rule.

8. A system according to claim 7, wherein $q=0$.

9. A system according to claim 7, wherein $q=0$ and $r=1$ and $s=9$.

10. A system according to claim 7, wherein $q=0$ and $r=1$ and $s=9$ and $p=11$.

11. A system according to claim 7, wherein $q=0$ and $r=1$ and $s=9$ and $p=11$, and $n$ is equal to or less than 10.

12. A system adapted for checking the correctness of entry on the keys of a keyboard having character keys arranged in a matrix of $s+1$ rows and $m+n$ columns, of any $n$-digit information number conforming to the mathematical rule $$\sum_{i=1}^{i=n} DiWi \equiv 0 \bmod p$$

wherein $m$ may be zero and $n$ is the number of informationally significant digit positions in each information number, D represents a numerical value other than zero selected from the series of successive whole-number numerical values $r, r+1, \ldots, s-1, s,$ and of which there may be as few as two different values and as many as $s$ and which numerical values may be different in different ones of said informationally significant digit positions, W represents a whole number weight value other than zero and is different for each of said $n$ significant digit positions of the information number, $p$ is a prime number greater than any D and greater than any W, and $q$ is any selected whole number less than $p$, said system comprising: a keyboard including $m+n$ columns of character keys including $n$ columns of number keys, each of said $n$ columns being assigned an individual respective one of said weight values W, and each key of said $n$ columns having a key-operated switch and the respective rows of keys of said informationally significant $n$ columns of keys being assigned a respective one of consecutive numerical values comprised in the series of values, $r, r+1, \ldots, s-1, s$; means permitting closure of but one of said key-operated switches at a time in each of said $n$ columns of keys; means, including an asynchronously operable recirculating register having $p$ stages each of which stages comprises essentially a bistable magnetic device and a plurality of electrical conductor means each inductively linked to the magnetic device, and each stage also comprising a transistor so connected to two of the said conductor means that the transistor is triggered to the conductive state incident to magnetic change of a selected nature in the magnetic device and also so connected that current conducted by the transistor is effective to continue the said magnetic change, and said register having at any time a single digit only stored therein and shiftable repeatedly therethrough in stage-to-stage steps each representing an addition of one to an accumulative numerical total; and means rendered effective by closure of a key-operated switch in each of said $n$ columns to shift said digit in said register through stage-to-stage shifts equal in number to the sum of the products of the column weights of the respective depressed keys in said $n$ columns multiplied by the respective numerical values of the depressed keys, whereby if the number entered on the keyboard by the depressed keys in said $n$ columns conforms to the aforestated rule, said digit will at the conclusion of said shifting repose in a selected stage and thus verify entry of a number conforming to said rule.

13. An electronic control system apparatus for selectively controlling function-controlling units of a third series of such units by selective action of at least one function-controlling unit of a second series of such units, under the primary control of at least one of a first series of such units, comprising in combination: a source of electric potential; first, second and third series of function-controlling units each of which units comprises a transistor and a bistable magnetic core capable of being coerced to each of opposite remanent magnetic states designated "0" and "1," and each of said units having conductors each inductively linked to the core thereof for cooperation therewith in coercing the core to opposite remanent states and for producing an induced potential upon magnetic change of the core from one remanent state toward the other, and each unit further comprising connections to said source of potential and connections for applying said induced potential to the transistor of the unit to induce conduction of transistor current therein and also comprising connections for directing the transistor current in a direction tending to reverse the state of the core of the unit; and means including conductive connections for applying a transistor current of a unit of one of said series of units to windings of at least two other units of said first, second, and third series of units in a direction to reverse the remanent state of at least one of the said two units; whereby a functional control ability inherent in the reversal of remanent state of a core of a unit of said first series of units is transferred to at least one other unit of said first, second, and third series of units.

14. Control apparatus comprising, in combination: a plurality of operation-controlling units each capable of performing a control function and each capable of storing indefinitely an ability to perform a control function, each of said units comprising essentially a transistor and a bistable magnetic core and a plurality of coils inductively linked with the core, and each core being capable of coercion to each of opposite remanent magnetic states arbitrarily designated "0" and "1" with "1" representing storage of said ability, and each core arranged to be coerced to either state from the other by a current properly directed through coil means linked therewith, and each transistor being associated with a respective core and having an exciting electrode and two current electrodes; a first means connecting the transistor exciting electrode for excitation by a potential induced in a coil linked to its associated core, incident to commencement of coercion of the core from "1" to "0;" a second means connecting the current electrodes of the transistor of a first of said units to direct the transistor current to perform a control function upon a second and a third of said units by initiating change of the remanent magnetic state of the cores of said second and third units; and third means for coercing the core of said first unit to "1" and for thereafter commencing coercion of the said core of the first unit to "0."

15. Apparatus as defined in claim 14, said second means so connecting a transistor current electrode of the first of said units to coils of said first, second, and third of said units that the transistor current aids coercion of the core of the first unit to "0" and coerces the core of at least the second unit to "1" to thereby transfer ability to perform a control function from the first to at least the second of said units.

16. Apparatus as defined in claim 15, said second means also connecting the said transistor current electrode to coils of a number of said units to change the remanent state of the respective cores of at least certain ones of said number of units, whereby to transfer ability to perform a control function from said first unit to each of said certain ones of said number of units.

17. Control apparatus comprising, in combination: a first control unit comprising a transistor and a bistable magnetic core associated therewith and said unit further comprising a plurality of individual coils each inductively linked to the core of the unit and including a coil connected to the transistor and adapted to have induced therein a potential for triggering the transistor into conduction incident to change of state of the core from "1" to "0" where "1" and "0" represent respective opposite remanent states of the core and the "1" state is selected to represent an active status of the unit representing storage of ability to perform a control function; a plurality of additional units similar to said first control unit and having like characteristics; means interconnecting said units and effective to change the state of at least two of said additional units to the active state incident to change of state of the core of said first control unit from "1" to "0" whereby to transfer from said first control unit to at least said two of said additional units the said ability to perform a control function; and means for placing said first unit in "1" state and initiating coercion of the core thereof from "1" to "0."

18. Apparatus effective to check conformity of a registration of a plural-character representation with a prescribed mathematical congruence with which the representation must agree if the registration is correct, said apparatus comprising: first means, including at least first register means and second register means and third register means at least two of which register means are single-bit shift-register means arranged to contain at any time only one respective binary digit per register, and each of which register means comprises serially-connected register units each of which units essentially comprises a respective bistable magnetic device and associated therewith at least first and second and third electric conductor means each inductively linked to the respective associated magnetic device, and each register unit further essentially comprising an associated respective transistor means connected to a respective first electric conductor means and to a respective second electric conductor means of the register unit, the connections being so arranged that conditional upon the magnetic device being in a selected first stable state and incident upon passage of electric current in a selected direction in a said first electric conductor means a second electric current is inductively created in a said second electric conductor means of the unit and is applied to the associated transistor means to trigger the transistor means to the conductive state and the connections further being such that current conducted by the associated transistor means courses through a said third electric conductor means of the unit in a direction and of such magnitude as to change the magnetic device of the unit to the opposite or second stable state; second means, including register-control units arranged for control of respective ones of said register means, and electric current supply means and additional electric conductor means, said supply means and additional conductor means being arranged to supply electric current to the respective register means and to so connect at least one transistor means associated with a register unit of a specific register to pass transistor-conducted current through a first electric conductor of at least one register unit of a different specific register, and said second means comprising also an electrical interconnection between a register unit of a specific register and a control unit of a different register; and third means, including means for registering a plural-character representation in one of said registers, and means for initiating operation of the apparatus; whereby cross-control of registers and register control units is secured and whereby a plural-character representation registered in one of said registers may by serial asynchronous operation of said units check the registration of the said representation for conformity with a prescribed mathematical congruence.

19. Apparatus for checking conformity with a mathematical congruence which defines a particular class of acceptable plural-digit numbers, of a plural-digit number registered on the keyboard of a keyboard machine having number-representing keys, said apparatus comprising, in combination with respective key-operable switches each associated with a respective key of the machine: first means, including a plurality of asynchronously operable units each of which units comprises in association a transistor and a bistable magnetic device and at least first and second electric conductors each individually inductively linked with the magnetic device and two of which conductors are so connected to the associated transistor that upon change of the associated magnetic device from a selected first magnetic state toward a second magnetic state the transistor is rendered conductive to pass an electric current through one of the said conductors in a direction such as to tend to change the said device to the said second magnetic state, said operable units being electrically arranged to form first, second, third, and fourth asynchronous single-bit shift registers; second means, including electric current supply means and electric conductor means arranged to supply electric current to said first means, and electric indicator means; third means, including a plurality of control units each similar to any of said operable units and each associated with and effective to control a respective one of said single-bit shift registers, said third means further including electrical interconnections between said control units and respective shift registers and between said second shift register and said key-operable switches and between said key-operable switches and said third shift register; and fourth means, including operations-initiating means for initiating operations of the apparatus; whereby upon actuation of said operations-initiating means, selected ones of said operable units and said control units operate asynchronously in serial order to determine conformity of the registered plural-digit number with the mathematical congruence and operate said indicator means in event of failure to so determine conformity.

20. In apparatus operating in accordance with a prescribed mathematical congruence of the form $$\sum_{i=1}^{i=n} DiWi \equiv q \mod p$$

wherein $n$ is the number of significant digit positions in each information number, $Di$ are numerical values representing the digits making up an information number, $Wi$ are numerical values representing the weights to be assigned to the respective columns of an information number, $p$ is a number greater than any $Di$ and greater than any $Wi$, and $q$ is a selected whole number less than $p$, the combination of: means for storing the digits of an information number in accordance with the column positions thereof, an input register, scanning means initiated after storage of said digits for asynchronously scanning the stored digits and for successively setting said input register to settings corresponding to the numerical values $Di$ of each of said digits, an accumulator register having a plurality of bistable units the number and arrangement of which are chosen to provide a count representative of mod $p$, means for interrogating said input register after each digit is set up therein and for advancing the count of said accumulator register in accordance therewith, means coupling said scanning means to said input register so that the next digit of said information number is scanned and set up in said input register in response to said input register having advanced said accumulator register to a count in accordance with the numerical value of the previous digit, whereby the scanning of the stored digits is performed in a self-sequencing manner, weighting means coupled to said scanning means and responsive to the completion of each scan for causing successive asynchronous self-sequencing scans of stored digits in accordance with the column weighting W*i* of each digit of said information number, and means initiated after the completion of scanning to determine the relationship of the count of said accumulator register to said mathematical congruence.

21. Apparatus operating in accordance with a prescribed mathematical congruence comprising: means for storing the digits of an information number in accordance with the column positions thereof, an input register, asynchronous scanning and weighting means initiated after storage of said digits for performing a plurality of asynchronous scans of the stored digits in accordance with said mathematical congruence, means for successively setting said input register to settings corresponding to the numerical values of said digits as each digit is scanned, an accumulator register for progressively counting in response to the setting of said input register in a manner so as to indicate conformity with said mathematical congruence, said input register being constructed and arranged in conjunction with said scanning and weighting means so that the next digit of said information number is scanned in response to the input register having advanced the accumulator register to a count in accordance with the numerical value of the previous digit set up in said input register, whereby the scanning of said stored digits is performed in a self-sequencing manner, and means initiated after completion of scanning for providing an indication corresponding to the relationship of the count of said accumulator register to said mathematical congruence.

22. In apparatus for checking the conformity of an information number with a prescribed mathematical congruence, the combination of: means for storing the digits of said information number in accordance with the column positions thereof, scanning means initiated after storage of said digits for asynchronously scanning the stored digits in a self-sequencing manner, input register means in which the numerical value of each of said stored digits is set up as each digit is scanned by said scanning means, accumulator register means for counting in accordance with said prescribed mathematical congruence, first control means cooperating with said scanning means and said weighting means and said input register means to cause a plurality of successive asynchronous self-sequencing scans to be performed on the stored digits of said information number in a manner so that each digit is set up in said input register in response to the scanning thereof, a digit being scanned no more than one time during each scan, the number of asynchronous scans performed being chosen so that each digit is scanned a number of times equal to the column weighting thereof, second control means cooperating with said input register means and said accumulator register means to cause the count of said accumulator register means to advance in accordance with the numerical value of each digit set up in said input register means, and means initiated after all the scans have been completed to determine the relationship of the count of said accumulator register means to said mathematical congruence.

23. In apparatus operating in accordance with a prescribed mathematical congruence, the combination of: means for storing the digits of an information number in accordance with the column positions thereof, a plurality of registers including a scanning register, a weighting register, an input register, and an accumulator register, each register including a plurality of bistable units, a plurality of control devices for controlling the operation of said registers including a scanning register control device associated with said scanning register, a weighting register control device associated with said weighting register, an input register control device associated with said input register, and an accumulator register control device associated with said accumulator register, each of said control devices including a bistable unit which is normally biased to one of its two bistable states, means connecting said scanning, weighting and input registers and the respective control devices associated therewith so that after storage of said digits a plurality of asynchronous self-sequencing scans are made of the stored digits in a manner so that each digit is set up in said input register in response to the scanning thereof, the number of asynchronous scans performed being chosen so that each digit is scanned a number of time equal to the weighting assigned to the column position thereof, means connecting said input register and said accumulator register and the respective control devices associated therewith so that the count of said accumulator register is advanced in accordance with the numerical value of each digit set up in said input register, the number and arrangement of the bistable units of said accumulator being chosen so that the count thereof is representative of said prescribed mathematical congruence, and means initiated after all of the scans have been completed to determine the relationship of the count of said accumulator register to said mathematical congruence.

24. In apparatus operating in accordance with a prescribed mathematical congruence, the combination of: an input register having a plurality of successive settings chosen in accordance with the number system of the digits of an information number, a recirculating accumulator register having a plurality of settings chosen in accordance with said prescribed mathematical congruence so as to indicate conformance therewith, each of said registers being constructed and arranged so that the application of an interrogating signal thereto causes the register to advance to its next setting and in so doing to produce an output signal, an input register control device and an accumulator register control device, each being constructed and arranged to provide a delayed output signal in response to an input signal applied thereto, first means coupling said registers and said control devices so that the delayed output signals from said input register control device and said accumulator register control device are respectively applied as interrogating signals to said accumulator register and said input register, second means coupling said registers and said control devices so that the output signals from said input register and said accumulator register are applied as input signals to said accumulator register control device and said input register control device respectively, means for setting said input register to a setting in accordance with a digit of said information number and for applying an initiating input signal to said input register control device in response to the setting of said input register, whereupon said registers and control devices will alternately advance in an asynchronous self-sequencing manner, and means coupled to said input register for initiating the setting of said input register to the next digit of said information number when said input register advances to a predetermined setting, whereby self-sequencing operation of said apparatus is obtained.

25. In apparatus operating in accordance with a prescribed mathematical congruence, the combination of: storing means for storing the digits of an information number in accordance with the column positions thereof, an input register, scanning and weighting means initiated after storage of said digits for performing a plurality of asynchronous self-sequencing scans of the stored digits and for successively setting said input register to settings corresponding to the numerical values of said digits as each digit is scanned, an accumulator register constructed and arranged to progressively count in response to the settings of said input register in a manner so as to indicate conformity with said mathematical congruence, said scanning and weighting means including first and second registers and first and second control devices associated therewith, each of said first and second registers being comprised of a plurality of bistable units constructed and arranged so that the application of an interrogating signal thereto causes the register to asynchronously shift a single bit from one bistable unit to a succeeding bistable unit and in so doing to produce an output signal from the bistable unit from which the single bit is shifted, each of said control devices being constructed and arranged to provide a delayed output signal in response to an input signal applied thereto, means coupling said first and second registers so that the shifting of a bit from a bistable unit of said first register sets a corresponding bistable unit of said second register, means coupling said control devices and said first and second registers so that the output signals from said first and second control devices are respectively applied as interrogating signals to said first and second registers, means coupling said first control device to a predetermined one of the bistable units of said second register so that the output signal produced by the shifting of a bit therefrom is applied as an input signal to said first control device, means coupling the bistable units of said second register to said input register through said storing means so that the digits of said information number are scanned in accordance with the shifting of a single bit through said second register, means coupling said accumulator register to said second control device so that an input signal is applied to said second control device in response to said accumulator register being advanced to a count in accordance with the numerical value of a digit set up in said input register, and means responsive to the shifting of a bit from a predetermined one of the bistable units of said first register for causing said accumulator to be interrogated to determine whether said mathematical congruence is satisfied.

26. Asynchronously operated self-sequencing control circuitry comprising: first and second registers each having a plurality of successive settings and each being constructed and arranged so that the application of an interrogating signal thereto causes the register to advance to its next setting and in so doing to produce a register output signal, first and second control devices each being constructed and arranged to provide a delayed output signal in response to an input signal applied thereto, first means coupling said registers and said control devices so that the delayed output signals from said first and second register control devices are respectively applied as interrogating signals to said first and second registers, second means coupling said registers and said control devices so that the register output signals from said first and second registers are respectively applied as input signals to said second and first control devices, means for initially setting one of said registers to one of its settings while applying an initiating input signal to one of said control devices, whereupon said registers and control devices will alternately advance in an asynchronous self-sequencing manner.

27. The invention in accordance with claim 26, wherein each register includes a plurality of series-connected bistable units constructed and arranged so that the application of said interrogating pulse thereto causes the register to asynchronously shift a single bit from one bistable unit to a succeeding bistable unit and in so doing to produce said register output signal.

28. The invention in accordance with claim 27 wherein each bistable unit comprises a bistable magnetic element having windings inductively linked thereto and a transistor connected to pass current through one of said windings upon triggering of said transistor.

References Cited in the file of this patent
UNITED STATES PATENTS

| | | |
|---|---|---|
| 2,654,080 | Browne | Sept. 29, 1953 |
| 2,684,199 | Starreveld | July 20, 1954 |
| 2,684,201 | Starreveld | July 20, 1954 |
| 2,706,078 | Cooper et al. | Apr. 12, 1955 |
| 2,730,695 | Ziffer | Jan. 10, 1956 |
| 2,754,054 | Helmig et al. | July 10, 1956 |
| 2,805,409 | Mader | Sept. 3, 1957 |
| 2,886,240 | Linsman | May 12, 1959 |
| 2,888,199 | Reumerman et al. | May 26, 1959 |
| 2,911,149 | Rouche | Nov. 3, 1959 |
| 2,911,626 | Jones et al. | Nov. 3, 1959 |

UNITED STATES PATENT OFFICE
CERTIFICATION OF CORRECTION

Patent No. 3,040,985                                      June 26, 1962

Peter S. Glaser et al.

It is hereby certified that error appears in the above numbered patent requiring correction and that the said Letters Patent should read as corrected below.

Column 4, line 24, for "new" read -- now --; column 5, line 73, for "hereinatfer" read -- hereinafter --; column 9, line 9, for "elevent" read -- eleven --; column 11, lines 35 and 36, for "registers" read -- register --; column 12, line 59, for "fiive" read -- five --; column 13, line 50, for "cacumulator" read -- accumulator --; column 23, line 16, for "setting" read -- settings --; lines 62 and 63, for "plurailty" read -- plurality --; column 24, line 84, for "time" read -- times --.

Signed and sealed this 6th day of November 1962.

(SEAL)
Attest:

ERNEST W. SWIDER                                      DAVID L. LADD
Attesting Officer                                         Commissioner of Patents